United States Patent [19]

Dietrich, Sr. et al.

[11] 4,418,761

[45] Dec. 6, 1983

[54] ADJUSTABLE TILLAGE IMPLEMENT POSITIONING APPARATUS

[75] Inventors: William J. Dietrich, Sr., Congerville; Cary L. Sizelove, Eureka, both of Ill.

[73] Assignee: DMI, Inc., Goodfield, Ill.

[21] Appl. No.: 304,584

[22] Filed: Sep. 22, 1981

[51] Int. Cl.³ .................... A01B 61/04; A01B 29/00; A01B 35/28

[52] U.S. Cl. .................... 172/271; 172/552; 172/551; 172/573

[58] Field of Search ............ 172/551, 552, 705, 501, 172/271, 502, 497, 500, 462, 573

[56] References Cited

U.S. PATENT DOCUMENTS

| | | | |
|---|---|---|---|
| 500,418 | 6/1893 | Over | 172/552 |
| 796,884 | 8/1905 | Weatherly | 172/551 X |
| 2,569,464 | 10/1951 | Edwards | 172/551 X |
| 2,896,730 | 7/1959 | Spurgin | 172/551 X |
| 3,170,421 | 2/1965 | Norris | 172/271 X |
| 4,048,929 | 9/1977 | Zumbahlen | |
| 4,077,478 | 3/1978 | Neukom | 172/502 |

OTHER PUBLICATIONS

"Landoll Tilloll ™", published by Landoll Corporation, Marysville, KS.

"The 'One Trip' Series 80 Tillage Machines", published by Heath Farm Equipment, Fort Collins, CO.

*Primary Examiner*—Richard J. Johnson
*Attorney, Agent, or Firm*—Emrich, Lee, Brown & Hill

[57] ABSTRACT

A mounting/positioning apparatus for attaching an agricultural implement such as a reel unit or a rotary packer assembly to the frame of a tillage machine is disclosed. The apparatus includes two opposing end portions rigidly coupled together by means of a cross member with the agricultural implement rotationally mounted between the two opposing end portions. The two end portions are pivotally coupled to a first frame cross member to which is rigidly coupled one end of a second frame member extending rearwardly therefrom. The other end of the second frame member is flexibly coupled to the cross member by means of a longitudinally compressible spring providing for the vertical displacement of the rotating implement upon impact with an obstruction. Spring tension is adjustable for varying the downward force applied to the working implement with the second frame member incorporating shear pin protection for the implement against high impact forces applied thereto from contact with rocks and other obstructions.

13 Claims, 4 Drawing Figures

ADJUSTABLE TILLAGE IMPLEMENT POSITIONING APPARATUS

BACKGROUND OF THE INVENTION

This invention relates generally to agricultural implements and particularly relates to an improved mounting and positioning apparatus for attaching a rotary agricultural implement to the frame of a conventional tillage machine.

Increasingly rotary agricultural implements are being utilized with conventional tillage machines during seed bed preparation. These rotary implements include rotary reels and rotary packer assemblies which may be mounted separately or in combination on a tillage machine. When used in combination, the reel is positioned forward of the packer assembly and aft of the plow units. The rotary reel breaks up the large clods of soil which are thrown up by the plows, and pulverizes and levels the soil following the plow units. The reel unit is also adapted to mix trash into the surface soil providing a seed bed with improved moisture absorption and retention while knocking the soil loose from the roots of the weeds uprooted by the plow units thereby reducing the need for herbicides. The rotary packer assemblies further pulverize clods, level the soil, and seal it following fertilizer application in order to fix the fertilizer in the soil. The planting operation follows the plowing, pulverizing and leveling of the soil together with the application of a fertilizer and/or herbicide.

With increasing tillage machine size, more weight is available for working the soil in seed bed preparation. This permits deeper plowing, when desired, improved clod crushing and improved soil chemical treatment and sealing. However, increasing tillage machine size results in increased fuel consumption and, since the working implements are generally rigidly mounted on the frame of these machines, limited flexibility in following ground contour. Working implements rigidly attached to these heavy frames are also highly subject to wear and breakage caused by impact obstructions such as rocks. Finally, because of the sheer size of these larger machines, adjustments in the soil working depth generally require a complicated procedure necessitating the removal and replacement of a large number of parts. For example, in one currently available tillage machine to change the spring pressure applied to the various working implements attached to the machine frame requires the removal and reinsertion of 32 bolts in adjacent sets of holes.

One example of a tillage machine employing a rotary reel in combination with a rotary packer assembly is disclosed in U.S. Pat. No. 4,048,929 to Zumbahlen. In this invention the reel unit and packer assembly are each biased downwardly by spring means positioned between lower frames to which the reel and packer assembly are mounted and the upper frame. In this approach, there is no provision for changing the downward pressure applied to the reel and packer assembly for controlling the working depth. This is a very desirable feature in tillage equipment since soil conditions, such as moisture content, mellowness, hardness, etc., can change very rapidly. In addition, this invention provides no protection for the rotary working implements against damage or destruction from impact with rocks.

Another approach in soil working implement design involves the use of a U-shaped, flat leaf spring, one end of which is clamped to the tillage machine main frame with the other end having punched holes to accomodate a pillow block bearing. Spring pressure can be varied only by the incorporation, with difficulty, of shims between the frame and the spring. No provision is made in this approach for the free vertical displacement of the spring-loaded reels upon impact with a rock.

SUMMARY OF THE INVENTION

Accordingly, it is an object of the present invention to provide an improved means for mounting and positioning a rotary agricultural implement on a conventional tillage machine which affords implement protection from high impact force collisions with rocks and other obstructions. Working depth is controlled by downward acting, variably tensioned springs which also permit the implement to conform to ground contour without the need for a large and heavy frame. The downward force applied to the implement can be easily changed by varying the tension on the springs. A shear pin release mechanism is provided for protecting the implement from large displacement forces.

The present invention contemplates mounting a rotary agricultural implement to a horizontal mounting bar of a tillage machine by means of two opposing sections positioned at each end of the implement in rotational engagement therewith and pivotally coupled to the mounting bar. The two opposing end sections are rigidly coupled together by means of a cross member running the length of and generally parallel to the horizontal mounting bar. The mounting bar is rigidly coupled to one end of a support bar which extends horizontally rearward therefrom. The other end of the support bar is coupled to the cross member by means of a shaft-mounted longitudinally compressible spring. By changing the length of the shaft by re-positioning a single pin, the downward pressure applied to the implement may be varied. Rotation stops limit the upward displacement of the implement during normal operation while a shear pin release provides for the free movement of the implement following high impact force contact with an obstruction such as a rock.

Unique coupling of the shaft-mounted spring to the horizontal mounting bar by means of the support bar permits the upward displacement of the rotary implement to be opposed by means of a variable spring force while providing for free downward implement displacement under gravity action. Thus, spring compression lags initial implement upward displacement with continued upward displacement, and the resulting increasing spring compression force, causing the severing of the shear pin thus permitting free implement displacement.

BRIEF DESCRIPTION OF THE DRAWINGS

The appended claims set forth those novel features believed characteristic of the invention. However, the invention itself as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
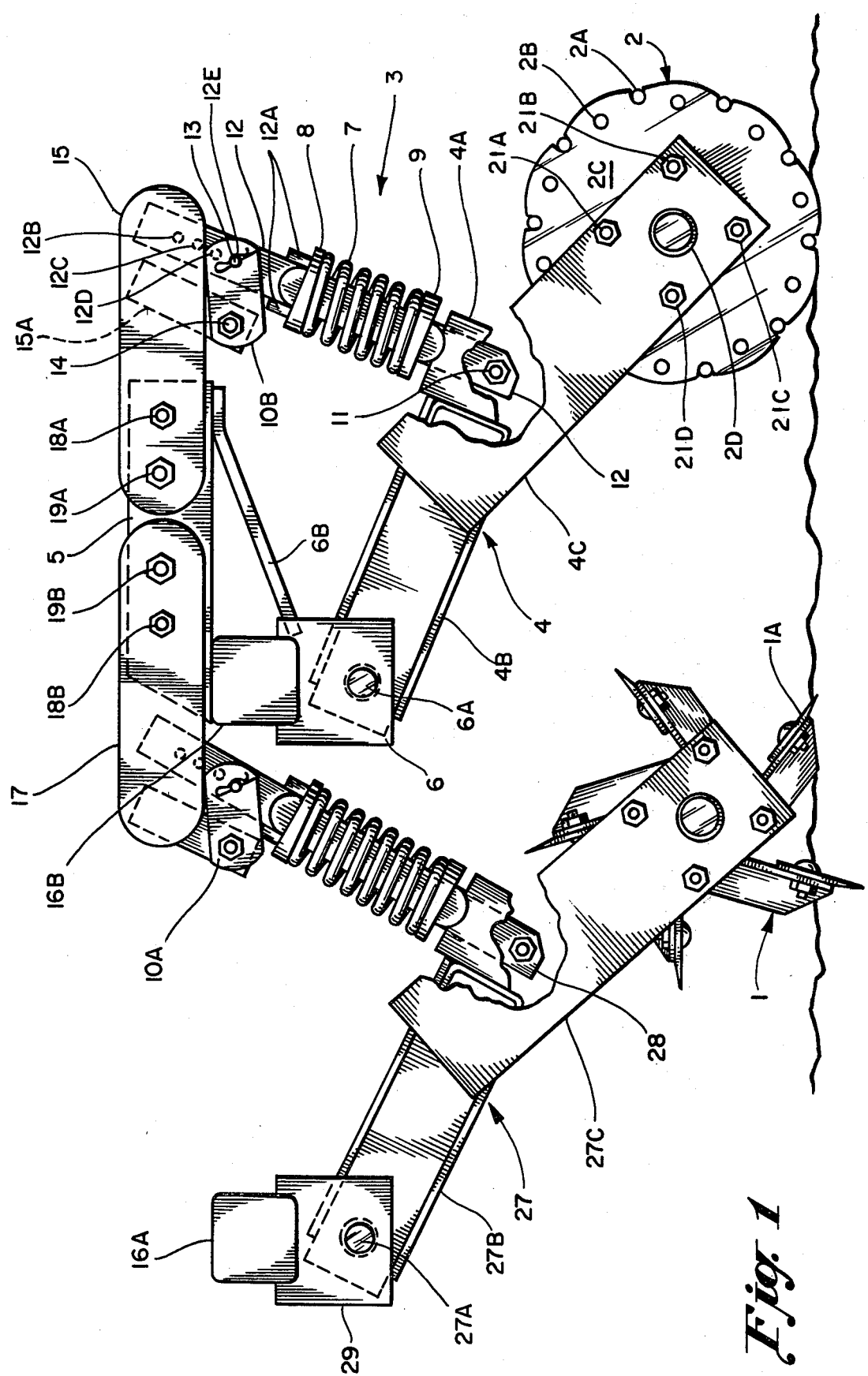
FIG. 1 is a side view of the adjustable tillage implement positioning apparatus of the present invention.

Referring to FIG. 1, there is shown an adjustable tillage implement positioning apparatus 3 in accordance with the present invention. Positioning apparatus 3 is designed to flexibly couple a horizontal mounting bar, or frame member, 16B of a tillage machine to a rotary agricultural implement. A conventional tillage machine generally includes a plurality of horizontal mounting bars such as 16A, 16B positioned generally perpendicular to the direction of motion of the machine during operation for mounting and positioning various working implements, as shown in FIG. 1. These machines also generally include a second plurality of horizontal frame members generally aligned along the direction of travel of the tillage machine during operation and coupled to the horizontal mounting bars for support and structural integrity. These latter horizontal frame members are not shown in FIG. 1 in order to avoid unnecessary detail.

As depicted in FIG. 1, the tillage machine during operation would travel from right to left having forward and rear rotary agricultural implements 1, 2. In FIG. 1, the forward implement is depicted as a rotary reel 1 having a plurality of blades 1A. As the tillage machine is moved forward, reel 1 rotates with its blades 1A engaging the soil to break up large clods of soil thrown up by plow assemblies (not shown) generally mounted forward of rotary reel 1 and to pulverize and level the soil following the plow units.

The rear rotary agricultural implement shown in FIG. 1 is a rotary packer reel 2 which also rotates with the forward travel of the tillage machine to further break up clods and seal the surface of the soil for improved moisture and fertilizer retention. Packer reel 2 includes a plurality of peripheral rods 2A and internal rods 2B which run the length of the packer assembly, leveling and firming the soil for seed bed preparation. A detailed discussion of the structure and operation of packer reel 2 is provided below. While the present invention is described herein as employing a forward rotary reel implement and a rear packer reel implement, it is not limited to this configuration and indeed is capable of mounting and positioning any rotary agricultural implement or any combination thereof. In addition, the present invention is designed for mounting and positioning a single rotary agricultural implement on either a single mounting bar or two adjacent mounting bars of a tillage machine.

Rigidly attached to the upper portion of horizontal mounting bar 16B and extending rearward therefrom is support member 5. Rigidly attached to the lower portion of horizontal mounting bar 16B is mounting bracket 6. Mounting bar 16B is also rigidly coupled to support member 5 by means of mounting bracket brace 6B extending therebetween. Pivotally coupled to mounting bracket 6 by means of pin 6A positioned in an aperture therein is lateral arm 4 which includes an upper segment 4B, coupled to mounting bracket 6, and a lower segment 4C, rotationally coupled to packer reel 2. Packer reel shaft 2D is mounted in bearings 20, as shown in FIG. 4, by means of a plurality of bolts 21A through 21D to lower segment 4C of lateral arm 4. A lower segment 4C of lateral arm is located at each end of packer reel 2 for the mounting and positioning thereof, although both of these elements are not shown in the side views of FIGS. 1–3.

Upper segment 4B an lower segment 4C of the lateral arm 4 are rigidly coupled and, in combination, are free to pivot about pin 6A positioned in mounting bracket 6. Coupled to upper segment 4B and lower stegment 4C is bracket 4A including an aperture through which telescoping bar 12 is positioned. The position of telescoping bar 12 in the aperture of bracket 4A is maintained by means of a nut and bolt combination 11 inserted therethrough. Positioned above and in contact with bracket 4A is lower casting 9 through which telescoping bar 12 is inserted. Linearly compressible spring 7 is positioned around telescoping bar 12 so as to rest upon lower casting 9. Upper casting 8 is similarly positioned on the upper end of spring 7 with telescoping bar 12 inserted through an aperture therein. Rigidly affixed to telescoping bar 12 are insert tabs 12A for securely positioning the combination of spring 7 and upper and lower castings 8, 9 along telescoping bar 12. Lower casting 9 contacts bracket 4A preventing the downward movement of spring 7 along telescoping bar 12.

Variably positioned by means of a plurality of pressure setting pin holes 12B, 12C, 12D and 12E, through which pin 13 is inserted, is folding link 10B. Folding link 10B is pivotally coupled to the upper portion of telescoping bar 12 by means of a pin and cotter pin combination 13 and is also pivotally coupled to rear stop 15 by means of rear stop mounting bracket 15A rigidly coupled thereto. Folding link 10B is pivotally coupled to rear stop mounting bracket 15A by means of a nut and bolt combination 14. Rear stop 15 is coupled to support member 5 by means of mounting bolt 19A and shear bolt 18A. As packer reel 2 rides over the ground surface, its vertical displacement results in the displacement of bracket 4A causing the vertical displacement of telescoping bar 12. The vertical displacement of telescoping bar 12, which is opposed by spring 7, causes folding link 10B to pivot around the nut and bolt combination 14 coupled to rear stop mounting bracket 15A. The upper limit of packer reel 2 and telescoping bar 12 vertical displacement under normal operating conditions is established by the rotation of folding link 10B against the lower portion of rear stop 15. When folding link 10B contacts rear stop 15, further vertical displacement of packer reel 2 is opposed by the compression of spring 7.

During normal operation, the pivoting action of folding link 10B permits packer reel 2 to fall freely under the influence of gravity in following ground contour. As packer reel 2 approaches an upraised portion of the soil, its upward displacement will compress spring 7 thus increasing the downward force applied to packer reel 2 in smoothing the soil surface. Continued upward displacement of packer reel 2, such as upon impact with an obstruction in the soil, will cause folding link 10B to further rotate and strike the lower portion of rear stop 15 in limiting packer reel upward displacement.

By selectively positioning pin 13 in one of the pressure setting pin holes 12B through 12E on the upper portion of telescoping bar 12, the downward force applied to packer reel 2 may be varied. By varying the downward pressure applied to packer reel 2 in this manner, not only may the soil working characteristics of the packer reel in terms of smoothing and breaking up the soil be precisely controlled, but also the ground contour following characteristics of the packer reel may be varied as required. The ability to selectively control these operating characteristics of packer reel 2 is greatly facilitated by means of variably positioning a single pin along telescoping bar 12.

Although the ground riding characteristics of packer reel 2 may be controlled by means of spring 7 and variably positioned folding link 10B, the danger of damaging or destroying a working implement due to impact with a rock or other obstruction is still present. The present invention avoids this source of farm implement damage by incorporating a quick disconnect feature in the event a high impact force is applied to the rotary agricultural implement. This quick disconnect feature is incorporated in the coupling between support member 5 and rear stop 15. Two nut and bolt combinations 18A, 19A cooperate in coupling support member 5 and rear stop 15. Rear shear bolt 18A, being the smaller of the two, acts as a shear pin in that it is severed upon application of a high impact force applied in a vertical direction to packer reel 2. The shearing of bolt 18A permits rear stop 15 to freely pivot with respect to support member 5 about rear mounting bolt 19A. Thus, a large vertical displacement of packer reel 2 will cause folding link 10B to impact rear stop 15. If the impact force applied to packer reel 2 is of a great enough magnitude, the impact of folding link 10B upon the lower portion of rear stop 15 will cause rear shear bolt 18A to be severed allowing the combination of rear stop 15, telescoping bar 12, frame 4 and packer reel 2 to freely rotate with respect to support member 5 about rear mounting bolt 19A. The "give" thus afforded packer reel 2 allows it to absorb high impact forces applied thereto such as in a collision with a rock thus avoiding damage to or the destruction of the rotary agricultural implement coupled to the mounting and positioning apparatus of the present invention.

FIG. 1 shows rotary reel 1 rotationally coupled to lower segment 27C of lateral arm 27. Lower segment 27C is rigidly coupled to upper segment member 27B which, in turn, is pivotally coupled to forward mounting bracket 29 by means of pin 27A. With forward mounting bracket 29 rigidly coupled to forward horizontal mounting bar 16A, rotary reel 1 is thus pivotally coupled to forward horizontal mounting bar 16A.

The difference between the installations of the forward implement 1 and the rear implement 2 involves the positioning of forward stop 17 which is coupled by means of support member 5 not to forward horizontal mounting bar 16A, but rather to rear horizontal mounting bar 16B. Thus, the imposition of a large upward force upon rotary reel 1 causes forward coupling link 10A to rotate counter-clockwise and impact the lower portion of forward stop 17. Further vertical displacement of rotary reel 1 and its associated lateral arm 27, telescoping bar 28 and forward folding link 10A will result in the further vertical displacement of the forward portion of forward stop 17 in a clockwise direction, severing forward shear bolt 18B and allowing the entire forward mounting and positioning apparatus to rotate freely with respect to support member 5 about the axis of forward mounting bolt 19B. The operation of the forward mounting assembly in positioning rotary reel 1 is identical to the functioning of the rear mounting apparatus in positioning packer reel 2. Thus, a single rotary agricultural implement mounted and positioned in accordance with the present invention may be pivotally coupled to either a single horizontal frame mounting member or may be pivotally coupled to two adjacent frame mounting members.

Figure 2:
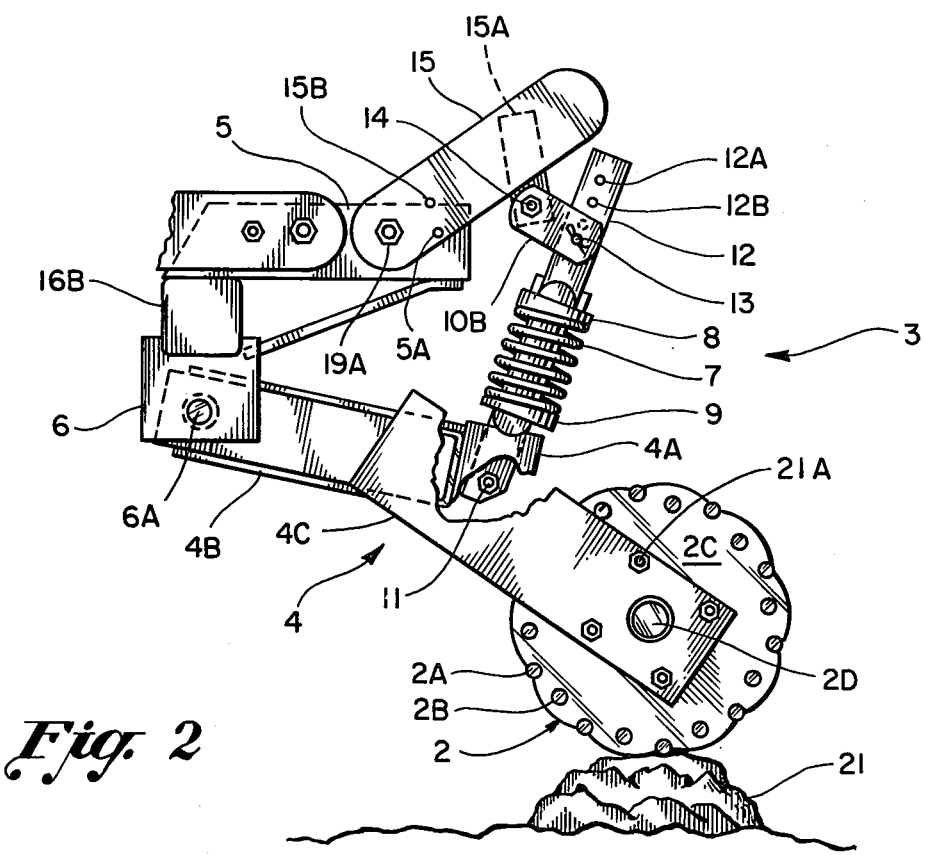
FIG. 2 shows a side view of the adjustable tillage implement positioning apparatus wherein a rotary packer assembly coupled thereto is in contact with and displaced by a rock resulting in the breaking of a shear pin and the free movement of the implement positioning apparatus in accordance with the present invention.

FIG. 2 shows the adjustable tillage implement positioning apparatus 3 of the present invention in a partially raised position where packer reel 2 has been forced upward by impact with a rock 21. Here packer reel 2 is free to pivot about the axes of pivot pin 6A and rear mounting bolt 19A. The upward displacement of packer reel 2 has caused folding link 10B to impact the lower portion of rear stop 15, severing the rear shear bolt (not shown) resulting in the upward displacement of rear stop 15. The displacement of rear stop 15 and the severing of the rear shear bolt causes aperture 15B in rear stop 15 and aperture 5A in support member 5 to become misaligned during the free vertical movement of packer reel 2. Shear pin 18A is inserted through apertures 5A and 15B under normal operating conditions. Following the shearing of bolt 18A, in order to resume normal operations, apertures 5A and 15B must be re-aligned by raising rear frame member 16B in order to insert another shear bolt in the aforementioned apertures.

Figure 3:
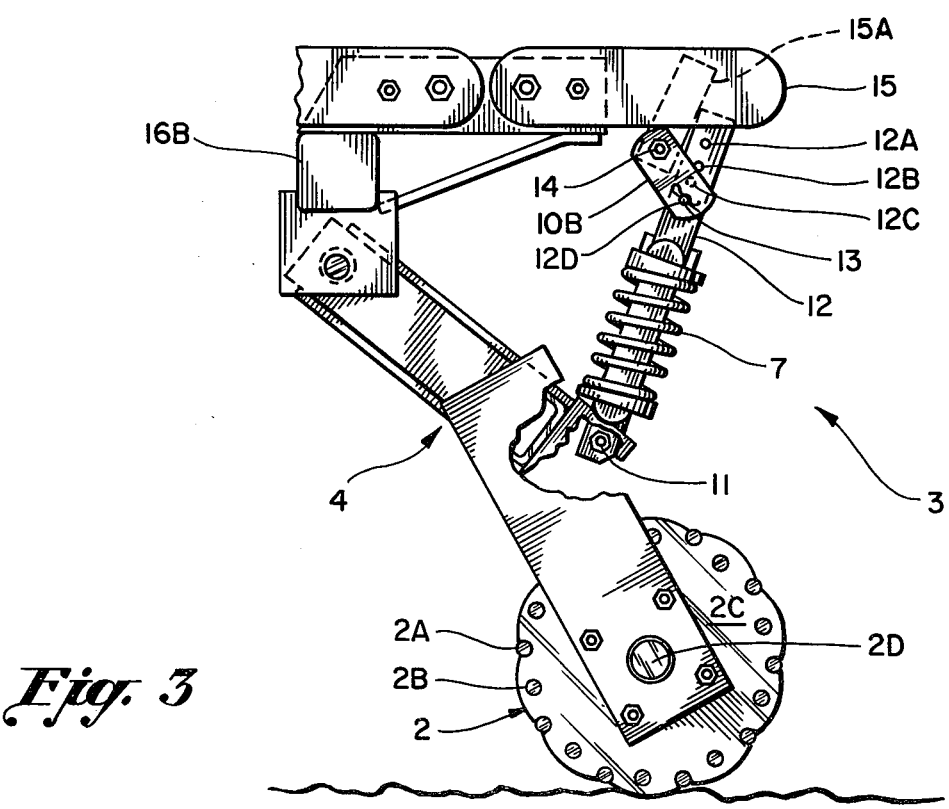
FIG. 3 shows a side view of the adjustable tillage implement positioning apparatus of the present invention in the fully extended position with the rotary packer assembly just touching the soil.
Figure 4:
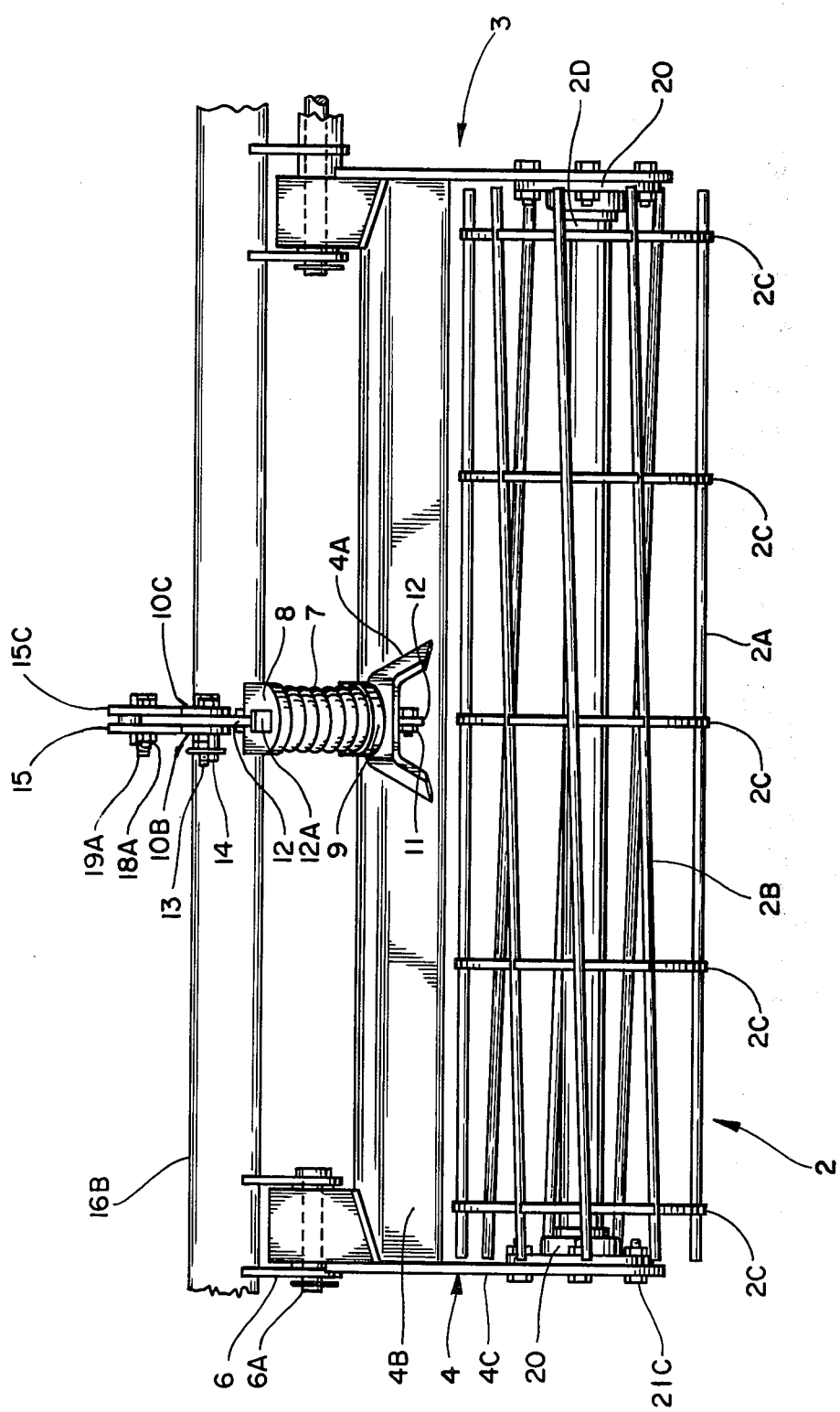
FIG. 4 is a rear view of the adjustable tillage implement positioning apparatus of the present invention.

FIG. 3 shows the adjustable tillage implement positioning apparatus 3 in a partially raised position where packer reel 2 is just touching the soil and folding link 10B is hinged downward so as to limit the downward displacement of packer reel 2. By thus allowing rotary working implement 2 to "float" with folding link 10B at, or near, the fully extended downward position, improved soil contour following is achieved by gravity action when the spring-provided downward pressure is not available because of soil irregularities. FIG. 3 also illustrates the manner in which the downward force applied to the rotary reel may be varied. By raising frame member 16B, folding link 10B is hinged to rear stop mounting bracket 15A by means of nut and bolt combination 14 in a downward position. With the downward force of the frame thus removed from telescoping bar 12, pin 13 may be removed from its present position and relocated to another pressure setting pin hole in telescoping bar 12. In this manner, the downward pressure exerted by spring 7 on lateral arm 4 and rotary reel 2 may be varied in changing the operating characteristics of the tillage machine. By positioning pin 13 and folding link 10B toward the upper end of telescoping bar 12, thus compressing spring 7, the downward force applied to the rotary reel 2 may be increased as desired.

Shown in FIG. 4 is a rear view of the adjustable tillage implement positioning apparatus 3 of the present invention. This view shows in greater detail the structure of packer reel 2. Packer reel 2 includes a plurality of peripheral rods 2A in alternating positions with internal rods 2B positioned around the periphery of a plurality of circular plates 2C positioned over the length of the rods. Circular plates 2C are rigidly coupled to packer reel shaft 2D which is mounted on bearings 20 at each end thereof and coupled to lower segment 4C of lateral arm 4. Peripheral rods 2A are typically welded to the perimeter of the circular plates 2C. If more rods are desired for enhanced clod crushing and soil smoothing, additional rods may be added by inserting them through apertures in the circular plates as in the case of internal rods 2B. The internal rods 2B thus telescoped through the circular plates 2C tend to rotate during operation increasing rod and plate wear. The peripheral rods 2A, however, are rigidly secured to circular plates 2C, such as by welding, permitting no movement therebetween and eliminating the wearing of either element due to relative movement therebetween. The peripheral rods thus mounted are not only more wear resistant, but they also reduce internal rod and circular plate wear when the telescoping internal rods are installed in the packer reel assembly for special uses.

Also, from FIG. 4 it can be seen that several elements of the preferred embodiment of the present invention shown in FIGS. 1-3 are mounted in pairs. For example, left and right rear stops 15, 15C are positioned respectively above left and right rear folding links 10B, 10C which are coupled to telescoping bar 12 by means of rear mounting bolt 19A and nut and bolt combination 14, respectively. Similarly, mounting bracket 6 includes right and left members as does lower segment 4C of lateral arm 4.

There has thus been shown an improved mounting and positioning apparatus for attaching a rotary agricultural implement to the frame of a tillage machine. The apparatus of the present invention facilitates changing the downward pressure applied to the rotary implement thus providing the capability to easily control its operating characteristics. This selective control of the downward pressure applied to the working implement also improves soil contour following. Soil contour following is also enhanced by allowing the working implement to "float" under the force of gravity when extreme soil elevation variations render implement positioning springs ineffective. Implement damage due to impact with rocks and other obstructions is avoided by means of a quick disconnect feature permitting the working implement to pivot freely about the frame member to which it is coupled following application of a high impact force thereto. In this regard, while the present invention has been described as employing a shear pin quick disconnect feature, it will be obvious to those skilled in the art that other quick disconnect schemes could be utilized in the present invention. For example, the spring trip linkage disclosed in co-pending patent application Ser. No. 278,191, filed June 29, 1981, in the name of William J. Dietrich, Sr., could be used equally well in the present invention. Similarly, the present invention has universal application to the mounting and positioning of any rotary agricultural implement, and any combination of a plurality thereof in a horizontal configuration, where all implements may be different or the same.

While particular embodiments of the present invention have been shown and described, it will be apparent to those skilled in the art that changes and modifications may be made therein without departing from the invention in its broader aspects. The aim in the appended claims, therefore, is to cover all such changes and modifications as fall within the true spirit and scope of the invention.

We claim:

1. Apparatus for mounting a rotary agricultural implement to a main frame of a tillage machine adapted to be pulled by a traction vehicle, comprising:
    a subframe;
    first mounting means for mounting said subframe to said main frame for rotation about a horizontal axis transverse to the direction of travel of said vehicle;
    second mounting means for mounting said implement to said subframe for rotation about a second axis parallel to said first axis;
    cushion mounting means connected to said subframe and including compression spring means for urging said subframe to a normal working position for said implement in relation to the ground being tilled thereby and characterized in that when said implement encounters an obstacle or ground elevation, said implement rotates in a first angular direction about said first axis to compress said spring means and when said implement encounters a depression relative to said normal working position said implement rotates about said first axis in a second direction opposite to said first direction primarily under gravity and without urging of said spring means; and
    hinged coupling means variably positioned along said cushion mounting means for pivotally coupling said cushion mounting means and said main frame and for varying the downward force applied to said implement by said cushion mounting means during normal operating conditions.

2. The apparatus of claim 1 wherein said main frame includes rotation stop means immediately adjacent said hinged coupling means for limiting the pivotal displacement thereof and thereby limiting the upward displacement of said implement during normal operating conditions.

3. The apparatus of claim 2 wherein said main frame further includes quick disconnect means responsive to an upward displacement of said implement exceeding the normal displacement thereof for de-coupling said cushion mounting means and said main frame in permitting the free vertical displacement of said implement following impact between said implement and an obstacle.

4. The apparatus of claim 1 wherein said main frame includes a first portion rigidly coupled to said first mounting means and a second portion pivotally coupled to said hinged coupling means, said first and second portions semirigidly connected by means of a shear pin and bolt combination with said shear pin breaking upon impact of said implement with an obstacle allowing the second portion of said main frame and said hinged coupling means to freely pivot about the first portion of said main frame by means of said bolt coupled therebetween.

5. The apparatus of claim 1 wherein said cushion mounting means further includes strut means in cooperative engagement with said compression spring means for coupling said subframe to said hinged coupling means, said strut means including a plurality of mounting apertures along its length of variably coupling said hinged coupling means thereto by means of a positioning pin in regulating the downward force applied to said implement.

6. The apparatus of claim 5 wherein said strut means is rigidly coupled to said subframe and pivotally coupled to said hinged coupling means permitting said hinged coupling means to pivot with respect to said main frame in response to the vertical displacement of said rotary agricultural implement.

7. The apparatus of claim 1 wherein said rotary agricultural implement comprises a rotary packer assembly including a plurality of circular plates positioned along a shaft, said shaft rotatably coupled to said second mounting means, and a plurality of first and second bars coupled to each of said circular plates and positioned generally parallel to said shaft, wherein said first plurality of bars are mounted around the peripheries of said circular plates and said second plurality of bars are mounted in aligned apertures located in non-peripheral portions of said circular plates.

8. The apparatus of claim 1 wherein said main frame includes a tool bar positioned generally horizontal and transverse to the direction of travel of said vehicle and coupled to said first mounting means, and structural means rigidly coupled to said tool bar and pivotally coupled to said hinged coupling means for providing an upper limit for the vertical displacement of said hinged coupling means following impact of said implement with an obstacle.

9. Apparatus for mounting a rotary agricultural implement to a main frame of a tillage machine adapted to be pulled by a traction vehicle, comprising:
   a subframe;
   first mounting means for mounting said subframe to said main frame for rotation about a horizontal axis transverse to the direction of travel of said vehicle;
   second mounting means for mounting said implement to said subframe for rotation about a second axis parallel to said first axis;
   cushion mounting means connected to said subframe and including compression spring means for urging said subframe to a normal working position for said implement in relation to the ground being tilled thereby and characterized in that when said implement encounters an obstacle or ground elevation, said implement rotates in a first angular direction about said first axis to compress said spring means and when said implement encounters a depression relative to said normal working position said implement rotates about said first axis in a second direction opposite to said first direction primarily under gravity and without urging of said spring means, said cushion mounting means further including a strut member aligned with said compression spring means and including a plurality of mounting apertures along the length thereof; and
   hinged coupling means variably positioned along said strut member by means of one of said mounting apertures for pivotally coupling said cushion mounting means and said main frame whereby the downward force applied to said implement by said cushion mounting means during normal operating conditions may be varied and wherein said main frame includes a first portion rigidly coupled to said first mounting means and a second portion pivotally coupled to said hinged coupling means, said first and second portions connected by means of a shear pin and bolt combination with said shear pin breaking upon impact of said implement with an obstacle allowing the second portion of said main frame and said hinged coupling means to pivot about the first portion of said main frame by means of said bolt coupled therebetween.

10. Apparatus for mounting a rotary agricultural implement to a main frame of a tillage machine adapted to be pulled by a traction vehicle, comprising:
    a subframe;
    first mounting means for mounting said subframe to said main frame for rotation about a horizontal axis tranverse to the direction of travel of said vehicle;
    second mounting means for mounting said implement to said subframe for rotation about a second axis parallel to said first axis;
    cushion mounting means connected to said subframe and including compression spring means for urging said subframe to a normal working position for said implement in relation to the ground being tilled thereby and characterized in that when said implement encounters an obstacle or ground elevation, said implement rotates in a first angular direction about said first axis to compress said spring means and when said implement encounters a depression relative to said normal working position said implement rotates about said first axis in a second direction opposite to said first direction primarily under gravity and without urging of said spring means, said cushion mounting means further including a strut member aligned with said compression spring means and including a plurality of mounting apertures along the length thereof; and p1 hinged coupling means variably positioned along said strut member by means of one of said mounting apertures for pivotally coupling said cushion mounting means and said main frame whereby the downward force applied to said implement by said cushion mounting means during normal operating conditions may be varied and wherein said main frame includes rotation stop means immediately adjacent said hinged coupling means for limiting the pivotal displacement thereof and thereby limiting the upward displacement of said implement during normal operation.

11. An apparatus for mounting and positioning a rotary agricultural implement on a horizontal mounting bar of a tillage machine, said apparatus comprising:
    first and second lateral arms rotationally coupled respectively to first and second end portions of said implement and pivotally coupled to said horizontal mounting bar for mounting said implement thereto;
    cross member means positioned generally parallel to said mounting bar for rigidly coupling said first and second lateral arms;
    support means rigidly coupled to said mounting bar and extending rearward therefrom;
    variable length strut means in combination with linearly compressible spring means connected to said cross member means for urging said rotary implement in a downward direction and in contact with the ground being tilled; and
    hinged coupling means for pivotally coupling said varible length strut means to said support means for selectively controlling the downward force applied to said implement by said variable length strut means and linearly compressible spring means combination and wherein the upward displacement of said implement is limited by the rotational impact of said hinged coupling means with said support means.

12. An apparatus for mounting and positioning a rotary agricultural implement on a horizontal mounting bar of a tillage machine, said apparatus comprising:
    first and second lateral arms rotationally coupled respectively to first and second end portions of said implement and pivotally coupled to said horizontal mounting bar for mounting said implement thereto;
    cross member means positioned generally parallel to said mounting bar for rigidly coupling said first and second lateral arms;
    support means rigidly coupled to said mounting bar and extending rearward therefrom, said support means including a first member rigidly coupled to said mounting bar and a second member coupled to said first member by quick disconnect means such that upon the severing of said quick disconnect means, said second member is free to rotate with respect to said first member;

variable length strut means in combination with linearly compressible spring means connected to said cross member means for urging said rotary implement in a downward direction and in contact with the ground being tilled; and hinged coupling means for pivotally coupling said variable length strut means to said support means for selectively controlling the downward force applied to said implement by said variable length strut means and linearly compressible spring means combination with the upward vertical displacement of said implement forcing said hinged coupling means in rotation-limiting contact with the second member of said support means in limiting the upward vertical displacement of said implement during normal operating conditions and wherein the impact of said implement with an obstacle vertically displaces said hinged coupling means beyond said rotation-limiting position severing said quick disconnect means in providing for the free displacement of said implement.

13. Apparatus for mounting a rotary agricultural implement to a main frame of a tillage machine adapted to be pulled by a traction vehicle, said main frame including a forward and an aft support member, said apparatus comprising:

a subframe;

first mounting means for mounting said subframe to said forward support member for rotation about a horizontal axis transverse to the direction of travel of said vehicle;

second mounting means for mounting said implement to said subframe for rotation about a second axis parallel to said first axis;

cushion mounting means connected to said subframe and including compression spring means for urging said subframe to a normal working position for said implement in relation to the ground being tilled thereby and characterized in that when said implement encounters an obstacle or ground elevation, said implement rotates in a first angular direction about said first axis to compress said spring means and when said implement encounters a depression relative to said normal working position said implement rotates about said first axis in a second direction opposite to said first direction primarily under gravity and without urging of said spring means; and hinged coupling means variably positioned along said cushion mounting means for pivotally coupling said cushion mounting means and the aft support member of said main frame and for varying the downward force applied to said implement by said cushion mounting means during normal operating conditions.

* * * * *